Patented Jan. 20, 1948

2,434,643

UNITED STATES PATENT OFFICE 2,434,643

OXIDATION OF AN ALKALI METAL SALT OF DEHYDROABIETIC ACID

Arthur E. Drake, Hockessin, Del., assignor to Hercules Powder Company, Wilmington, Del., a corporation of Delaware No Drawing. Application February 2, 1946, Serial No. 645,249

14 Claims. (Cl. 260—99)

This invention relates to the oxidation of resin acids and more particularly to the oxidation of dehydroabietic acid with an oxygen-containing gas.

It has been known that either powdered or molten rosin may be modified by treatment with oxidizing agents, such as air, ozone, hydrogen peroxide, potassium permanganate, sodium dichromate and the like, to furnish products having an increased melting point and greater content of oxygenated compounds. The oxidized rosins therefore have had greater utility in some applications and have, for instance, been suggested for use in core oils and have been considered as particularly suitable for saponification with ammonium hydroxide. Aqueous solutions of rosin size also have been oxidized with an oxidizing agent such as potassium permanganate to produce materials claimed to have marked antiseptic properties.

In accordance with this invention, it has been found that the alkali metal salts of dehydroabietic acid may be oxidized by a process comprising intimately contacting an aqueous solution containing an alkali metal salt of dehydroabietic acid and a water-soluble persulfate with an oxygen-containing gas. Utilization of this process produces new and useful materials.

In carrying out the process in accordance with this invention, an alkali metal salt of dehydroabietic acid, such as sodium dehydroabietate, is dissolved in water and to the resulting solution is added a water-soluble persulfate such as potassium persulfate. The solution containing both the dehydroabietic acid salt and the water-soluble persulfate then is heated and brought into intimate contact, as by blowing, with an oxygen-containing gas such as air. The oxidation is continued for a length of time which will vary somewhat depending upon the desired result. Following the oxidation, the solution may be utilized as such for some purposes or may be worked up to recover the reaction products.

The following examples are illustrative of the process in accordance with this invention. All parts given in the examples represent parts by weight.

Example I

Forty-eight parts of dehydroabietic acid and sufficient 0.5015 N aqueous sodium hydroxide to furnish 6.37 parts of sodium hydroxide were mixed and heated with stirring until solubilization occurred, the resulting solution was cooled, and then 2.88 parts of potassium persulfate dissolved in approximately 100 parts of water was added. Sufficient water was added to bring the total weight to 800 parts. The resulting solution constituted a 6% solution of dehydroabietic acid and contained 6% potassium persulfate based on the dehydroabietic acid. The solution was placed in a reaction vessel equipped with a reflux condenser and a high speed stirrer. The vessel and its contents were heated to a temperature of 65° C. and oxygen permitted to come in contact with the highly agitated solution for a period of 22 hours. Approximately 0.75 mol of oxygen per mol of dehydroabietic acid was thus absorbed, and the reaction mixture had a peroxide content of 0.10% calculated as hydrogen peroxide.

Sufficient dilute alkali was added to the reaction mixture to dissolve the material which had precipitated during the oxidation. The solution then was cooled to 0° C., acidified with cold, dilute hydrochloric acid and the resulting precipitate washed with water until free of acid. The precipitate constituted 48.3 parts of a nearly colorless, crystalline produce having a peroxide content of 1.4% calculated as hydrogen peroxide. Thirty parts of this product was rubbed with 200 parts of petroleum ether to obtain soluble and insoluble fractions. The petroleum ether-soluble fraction amounted to 6.9 parts (23%) having a neutral equivalent of 330 and containing 31-32% dehydroabietic acid. The petroleum ether-insoluble fraction amounted to 23 parts (77%) having a neutral equivalent of 342 and containing 16.5% of dehydroabietic acid and 62% of 9-ketodehydroabietic acid.

Example II

The process of Example I was carried out with the exception that the oxidation was effected at 35° C. until 1.4 mols of oxygen per mol of dehydroabietic acid had been absorbed. The reaction mixture had a negligible peroxide content and upon acidification the resulting precipitate was found to have a neutral equivalent of 305 and to contain 90% of 9-ketodehydroabietic acid.

Example III

To 76.8 parts of a mixture (solids content, 65.2%; acid number, 13.6) obtained by partial neutralization of a dehydrogenated rosin (dehydroabietic acid, 53%; abietic acid, 0.0%; retene, 0.2%) with concentrated aqueous sodium hydroxide were added approximately 300 parts of water and sufficient 0.5432 N aqueous sodium hydroxide to furnish 0.75 part of sodium hydroxide, heating and stirring being effected until complete solubilization occurred. The resulting solution was cooled and 3 parts of potassium persulfate dissolved in approximately 100 parts of water was added, after which sufficient water was added to bring the total weight to 833.3 parts. The resulting solution constituted a 6% solution of the sodium salt of the dehydrogenated rosin and contained 6% potassium persulfate based on the rosin salt. About 630 parts of the solution was placed in the reaction vessel described in Example I. The vessel and its contents were heated to a temperature of 65° C. and air was permitted to come in contact with the highly agitated solution for a period of 2.5 hours. Samples of the solution were withdrawn at intervals and tested as emulsifier in the emulsion copolymerization of butadiene and styrene.

The polymerizations were carried out by introducing 44.33 parts of each sample into a polymerization vessel with 47.3 parts of distilled water and 1.00 part of an activating salt solution. The 1.00 part of activating salt solution contained 0.00525 part of 78% ferric sulfate nonahydrate, 0.075 part of sodium pyrophosphate decahydrate and 0.00019 part of cobaltous chloride hexahydrate dissolved in 0.92 part of distilled water. To the resulting solution then were added 12.5 parts of styrene, 37.5 parts of butadiene and 0.25 part of the mixture of mercaptans derived from Lorol, which is a commercial product containing primarily lauryl alcohol but also some higher and lower aliphatic alcohols. The mixture was agitated at 50° C. for 14 hours in a sealed container. The emulsion then was run into an open vessel containing 5 parts of a 2% solution of phenyl β-naphthylamine, stripped of the excess butadiene and the polymer precipitated by the addition of an excess of a saturated salt solution. The precipitated polymer was washed with water until alkali free, then with alcohol, and finally was dried to constant weight on a mill. The results are tabulated in Table 1.

*Table 1*

| Sample No. | Length of Air Treatment, Hours | Polymer Yield |
| --- | --- | --- |
| 1 | 0 | 69.2, 69.6 |
| 2 | 0.75 | 73.4 |
| 3 | 1.5 | 74.4, 75.6 |
| 4 | 2.5 | 76.0, 76.4 |

The examples have set forth the use of both air and oxygen, but other oxygen-containing gases are operable. The oxygen may be furnished in the form of pure or commercial oxygen or in mixtures of oxygen with nitrogen or other inert gases. It is desirable that oxygen be the only active oxygen component in the gas. The air may be of increased or decreased oxygen content in case it is desirable to fortify the air with added oxygen or to recycle air which previously has been used in the process. The air may be used either as it is readily available or as humidified up to the saturation point.

The alkali metal salts of dehydroabietic acid described in accordance with this invention are prepared by neutralization of dehydroabietic acid or dehydrogenated rosin with an alkali metal compound which has basic characteristics. Alkali metal compounds suitable for this purpose are the hydroxides, carbonates, etc., of sodium, potassium, etc. The concentration of the alkali metal salt of dehydroabietic acid in the resulting solution may vary between about 3% and about 60%, but it is preferable that the concentration be between about 3% and about 10% and a particularly applicable concentration is about 6%.

Dehydroabietic acid may be prepared by the dehydrogenation or disproportionation of pure abietic acid or by the dehydrogenation or disproportionation of a natural rosin or a rosin material containing a substantial amount of a natural rosin, followed by separation of the acid from the dehydrogenated or disproportionated rosin or by any other known means. The rosins which may be dehydrogenated or disproportionated may be gum or wood rosin. If desired, the rosin may be isomerized by treatment with an acidic isomerizing agent prior to dehydrogenation or disproportionation.

The dehydrogenation or disproportionation reaction is carried out by contacting the rosin or rosin material at an elevated temperature with an active hydrogenation catalyst in the absence of added hydrogen to effect a dehydrogenation or disproportionation reaction. Catalysts such as palladium, platinum, nickel, copper chromite and the like are suitable. The catalysts may be supported on a carrier such as granular alumina, fibrous asbestos or activated charcoal. Dehydrogenation or disproportionation with a palladium catalyst, for example, may be conducted either by a batchwise or a continuous procedure. Thus, the rosin may be agitated with about 5% to about 20% by weight of a palladium catalyst supported on activated carbon (1% to 2% palladium) at about 150° C. to about 300° C. for about 1 to about 5 hours. In the continuous process, the molten rosin flows over the supported palladium catalyst at a temperature within the range of about 225° C. to about 300° C. to provide a contact time of about ¼ to about 1 hour.

It often is advantageous to refine the whole rosin prior to its dehydrogenation or disproportionation and the same is true as applied to the whole dehydrogenated or disproportionated product. Prior to its dehydrogenation or disproportionation, the rosin may be refined by crystallization, by means of a selective solvent such as furfural or phenol, or by an absorbent earth such as fuller's earth. The dehydrogenated or disproportionated rosin product also may be refined, as by distillation, heat treatment, alkali extraction, precipitation, etc. It is desirable that the dehydrogenated or disproportionated rosin or derivative thereof contain at least 45%, and preferably at least 50%, dehydroabietic acid and less than 2% abietic acid when the oxidized solution of the alkali metal dehydrogenated rosin salt is to be used in the emulsion polymerization of vinyl-type compounds.

Dehydroabietic acid itself may be separated from dehydrogenated or disproportionated rosin by various means, crystallization from a solvent solution being a practical method. For example, the dehydrogenated or disproportionated rosin may be heated with acetone to effect solution and the solution cooled and filtered to remove the crystals of dehydroabietic acid. Solvents such as ethyl acetate, ethyl alcohol, methyl alcohol, petroleum ether, etc., may be used in place of acetone. Another method of separating the dehydroabietic acid is by the sulfonation of dehydrogenated or disproportionated rosin and subsequent hydrolysis of the sulfonic acid, whereby a pure dehydroabietic acid is obtained. The dehydroabietic acid need not be pure dehydroabietic acid for the purpose of this invention, however. As discussed previously, various refined dehydrogenated or disproportionated rosins are suitable.

Although only potassium persulfate has been shown by the examples in conjunction with an alkali metal salt of dehydroabietic acid, other water-soluble persulfates are operable. Sodium persulfate, ammonium persulfate, etc., are exemplary. The concentration of the water-soluble persulfate may be varied from about 0.05% to about 9% based on the amount of solid alkali metal salt of dehydroabietic acid present. The preferable amount of persulfate on this basis, however, is about 6%. The treatment with the oxygen-containing gas is favored by dilute solutions of the alkali metal salt of dehydroabietic acid and by high concentrations of the water-soluble persulfate as well as availability of oxygen to the reaction mixture. In case, as in Example III, the oxidized solution is used in the emulsion polymerization of vinyl-type compounds, the preferable amount of persulfate is that usually employed in the polymerization reaction itself. There is no advantage in adding more persulfate to the emulsifying solution after the oxidation has been completed.

During treatment of the solution of the alkali metal salt of dehydroabietic acid with an oxygen-containing gas the temperature may be between about 25° C. and about 95° C., but a preferable range is from about 40° C. to about 70° C. A particularly applicable range is from about 50° C. to about 65° C. The length of time involved in the treatment may vary from about 0.5 to about 25 hours but a preferable time lies between about 2 and about 8 hours. Particularly useful is a reaction time of about 2 to about 4 hours at a temperature between about 50° C. and about 65° C.

Since the reaction between the solution containing the alkali metal salt of dehydroabietic acid and the oxygen-containing gas constitutes a two-phase system, suitable agitation is necessary. It is particularly important to bring the air or other oxygen-containing gas into intimate contact with the solution. This may be effected by whipping the air or oxygen into the solution by means of a high speed stirrer or by blowing the gas through the solution utilizing suitable nozzles, porous plates or their combinations.

Although Example III has shown only the emulsion copolymerization of butadiene and styrene, the oxidized dehydrogenated rosin salt solutions of this invention may be used in the emulsion polymerization of butadiene and its derivatives, such as isoprene, dimethyl butadiene, chloroprene, etc., or other compounds containing the vinyl group such as styrene, acrylonitrile, etc. These solutions have been found to be excellent emulsifying agents in the preparation of copolymers of butadiene and styrene or acrylonitrile, isoprene and styrene or acrylonitrile, and other rubber-like polymers, as well as in the preparation of polymers such as polyvinyl chloride, polyvinyl acetate, polystyrene, polymethyl methacrylate, polyvinylidene chloride and the various other addition polymers which may be prepared by the emulsion technique.

The polymerizations may be subjected to the same variations in reaction conditions, e. g., concentration of the reactants, temperature, pressure, etc., as those in which a fatty acid soap is used. The temperature of the reaction may vary from about 20° C. to about 100° C., preferably from about 40° C. to about 60° C.

The 9-ketodehydroabietic acid shown in Examples I and II is a new derivative of dehydroabietic acid and may be used as an intermediate in the preparation of other compounds containing the octahydrophenanthrene nucleus. For instance, an aqueous solution containing the sodium salt of 9-ketodehydroabietic acid may be treated with an excess of dimethyl sulfate while adding sodium hydroxide at such a rate as to keep the solution just alkaline to phenolphthalein. The methyl ester of 9-ketodehydroabietic acid precipitates from the alkaline solution and may be purified by known procedures. This ester may be used as a plasticizer for cellulose acetate.

The process of this invention provides a novel means for oxidizing dehydroabietic acid. Depending upon the purity of the dehydroabietic acid and the extent of oxidation, various useful materials are produced. Pure dehyroabietic acid may be oxidized to 9-ketodehydroabietic acid, which in turn may be used in the synthesis of other useful materials, and a dehydrogenated rosin containing substantial amounts of dehydroabietic acid may be so modified that, in the form of its alkali metal salts, it is a more efficient emulsifying agent in the polymerization of vinyl-type compounds.

What I claim and desire to protect by Letters Patent is:

1. A process of oxidizing an alkali metal salt of dehydroabietic acid which comprises intimately contacting an aqueous solution containing said salt and a water-soluble persulfate with an oxygen-containing gas.

2. A process of oxidizing an alkali metal salt of dehydroabietic acid which comprises intimately contacting an aqueous solution containing said salt and a water-soluble persulfate with an oxygen-containing gas at a temperature between about 25° C. and about 95° C.

3. A process of oxidizing an alkali metal salt of dehydroabietic acid which comprises intimately contacting an aqueous solution containing said salt and a water-soluble persulfate with an oxygen-containing gas at a temperature between about 40° C. and about 70° C.

4. A process of oxidizing an alkali metal salt of dehydroabietic acid which comprises intimately contacting an aqueous solution containing said salt and a water-soluble persulfate with an oxygen-containing gas at a temperature between about 25° C. and about 95° C. for about 0.5 hour to about 25 hours.

5. A process of oxidizing an alkali metal salt of dehydroabietic acid which comprises intimately contacting an aqueous solution containing said salt and a water-soluble persulfate with an oxygen-containing gas at a temperature between about 50° C. and about 65° C. for between about 2 hours to about 8 hours.

6. A process of oxidizing an alkali metal salt of dehydroabietic acid which comprises intimately contacting with an oxygen-containing gas an aqueous solution containing a water-soluble persulfate and from about 3 to about 60% of an alkali metal salt of dehydroabietic acid.

7. A process of oxidizing an alkali metal salt of dehydroabietic acid which comprises intimately contacting with an oxygen-containing gas an aqueous solution containing a water-soluble persulfate and from about 3 to about 10% of an alkali metal salt of dehydroabietic acid.

8. A process of oxidizing an alkali metal salt of dehydroabietic acid which comprises intimately contacting an aqueous solution containing said salt and from about 0.05 to about 9%, based on the amount of said salt, of a water-soluble persulfate with an oxygen-containing gas.

9. A process of oxidizing an alkali metal salt of dehydroabietic acid which comprises intimately contacting an aqueous solution containing about 6% of said salt and about 6%, based on the amount of said salt, of a water-soluble persulfate with an oxygen-containing gas.

10. A process of oxidizing an alkali metal salt of dehydroabietic acid which comprises intimately contacting an aqueous solution containing said salt and a water-soluble persulfate with air.

11. A process of oxidizing an alkali metal salt of dehydroabietic acid which comprises intimately contacting an aqueous solution containing said salt and a water-soluble persulfate with oxygen.

12. A process of oxidizing an alkali metal salt of dehydroabietic acid which comprises intimately contacting an aqueous solution containing the sodium salt of dehydroabietic acid and potassium persulfate with air.

13. A process of oxidizing an alkali metal salt of dehydroabietic acid which comprises intimately contacting an aqueous solution containing the sodium salt of dehydroabietic acid and potassium persulfate with oxygen.

14. As a new product, 9-ketodehydroabietic acid.

ARTHUR E. DRAKE.

REFERENCES CITED

The following references are of record in the file of this patent:

Lombard, Comptes Rendus, 213, Dec. 1941, pg. 793–6.

Certificate of Correction

Patent No. 2,434,643. January 20, 1948.

ARTHUR E. DRAKE

It is hereby certified that errors appear in the printed specification of the above numbered patent requiring correction as follows: Column 2, line 23, for the word "produce" read *product*; column 3, line 16, for "emulsifier" read *emulsifiers*; column 4, line 28, for "catalyst" read *catalyst*; line 41, for "trus" read *true*; line 66, for "alocohol" read *alcohol*; column 5, line 43, after the word "effected" insert *either*; and that the said Letters Patent should be read with these corrections therein that the same may conform to the record of the case in the Patent Office.

Signed and sealed this 30th day of March, A. D. 1948.

[SEAL]

THOMAS F. MURPHY,
*Assistant Commissioner of Patents.*